United States Patent [19]
Karpal

[11] Patent Number: 5,845,597
[45] Date of Patent: Dec. 8, 1998

[54] SEPARATION MEDIUM EFFICIENCY INDICATOR

[75] Inventor: David L. Karpal, San Diego, Calif.

[73] Assignee: Vista Water Systems, Inc., Vista, Calif.

[21] Appl. No.: 370,520

[22] Filed: Jan. 9, 1995

Related U.S. Application Data

[63] Continuation-in-part of Ser. No. 213,125, Mar. 15, 1994, abandoned.

[51] Int. Cl.⁶ .......................................... G01L 7/16
[52] U.S. Cl. ......................... 116/268; 116/272; 116/273; 73/744; 359/664; 210/90
[58] Field of Search ..................... 116/202, 264, 116/266, 268, 272, 273, DIG. 25, DIG. 42; 73/700, 744; 210/85, 87, 90, 91, 95, 652; 55/274, DIG. 34; 95/25; 359/664, 808, 809, 810, 811

[56] References Cited

U.S. PATENT DOCUMENTS

| | | | |
|---|---|---|---|
| 3,145,570 | 8/1964 | Grandstaff | 116/DIG. 42 |
| 3,182,630 | 5/1965 | Claeys | 116/268 |
| 3,358,836 | 12/1967 | Schmitt | 116/268 |
| 3,639,998 | 2/1972 | Mason | 116/268 |
| 3,678,882 | 7/1972 | Kinsella | 116/268 |
| 4,153,003 | 5/1979 | Willis | 116/268 |
| 4,445,457 | 5/1984 | Bargman | 116/268 |
| 4,993,460 | 2/1991 | Robinson et al. | 116/273 |

FOREIGN PATENT DOCUMENTS

47-11879  4/1972  Japan ..................................... 220/663

Primary Examiner—Diego F.F. Gutierrez
Assistant Examiner—Andrew Hirshfeld
Attorney, Agent, or Firm—Calif Tervo

[57] ABSTRACT

An efficiency indicator for a separation system, such as a water filter, wherein a first volume of fluid is exposed, under a first pressure, to a separation medium and a second volume of fluid is recovered therefrom, under a second, lesser pressure. The indicator comprises a housing including an aperture and a biased piston rod in a tube driven between a first position and a second spaced-apart position by the differential between said first and second pressures when said second pressure represents an undesired loss of medium separating efficiency. The piston rod has a first reflective colored coating at one location on said rod and a second reflective colored coating at a second location. A sphere of optical transparent material is mounted so as to project through the aperture of the housing. The sphere includes an outer portion exterior the aperture for gathering light exterior the aperture and an inner end interior the aperture and disposed adjacent the tube for focusing the gathered light in an area, the area being that occupied by said first colored coating when said piston is in its first position and that occupied by said second colored coating when the piston is in its second position, and for receiving light reflected from a coating and projecting it out through the outer portion thereby providing a clear visual indication of efficiency of the medium.

2 Claims, 6 Drawing Sheets

SEPARATION MEDIUM EFFICIENCY INDICATOR

This application is a continuation-in-part of my earlier application, filed Mar. 15, 1994, given Ser. No. 08/213,125, now abandoned.

BACKGROUND OF THE INVENTION

1. Field of The Invention

This invention pertains to the field of fluid separation. More particularly, it pertains to solid medium separation processes, such as filtration and reverse osmosis processes, and to a device that provides a clear visual indication that the medium is functioning properly and separating solids from liquid or has become clogged or fouled to the extent that separation efficiency has been reduced to an intolerable level.

2. Description of the Prior Art

Processes, such as filtration, are used for removing solids from liquids; reverse osmosis is used for purifying water by separating it from sea water. In these processes a first volume of fluid is exposed, under a first pressure, to a separation medium such as a filter pad, a container of loose filter media, or a semi-permeable membrane, and a second volume of fluid, such as clarified liquid such as potable water, is recovered therefrom, under a second, lesser pressure. These are usually continuous processes, as opposed to batch processes, and it is important to maintain the process in an energy-efficient manner to minimize costs.

In filtering processes, such as where an incoming water stream to a residence is passed through a filter, comprising activated carbon and layers of progressively smaller particles such as filtering clays or diatomaceous earth, the impurities in the water are filtered out of the stream and captured in the filter. Over time these impurities can clog the filter to the extent that it becomes so fouled that the output stream is reduced to a trickle. In a home environment it means the user must hold the cup or glass under the filtered-water spigot for a longer and longer time; in industry the gradual fouling of the filter can result in a loss of production such as to place great financial strain on the business when process cost per unit time rises to an intolerable level.

It is recognized in the separation industry that the pressure drop across the separation media provides a direct indication as to the efficiency of the media. When the pressure drop or differential across the filter or membrane is very small and the output stream contains the requisite purity, the separation media is functioning efficiently. As the pressure differential increases the media is beginning to accumulate materials that reduce the efficiency of the process. The point at which efficiency becomes intolerable may therefore be directly determined by the pressure differential developed across the separation medium.

In other separation processes, fine particles of activated carbon are packed with or glued to fibers forming the filter bed. The carbon particles contain fine pores, measured in microns, that accept chlorine atoms and molecules as well as atoms and molecules of other impurities. Removal of chlorine and other such impurities by activated carbon is a standard method of cleaning up the taste of water. When the impurities either fill up or clog the pores, the efficiency of the filtering medium is significantly reduced. Usually when this occurs, the impurities also clog the fiber matrix making up the filter bed. When this happens, the pressure drop across the bed begins to rise while separation efficiency begins to drop.

In commercial reverse osmosis processes this maximum pressure differential may be determined by observing the readings of various pressure gauges attached to input and output lines and to the medium manifold. Even then the operator must possess the necessary acumen to determine when the differential reaches the maximum value. With a growing work force of reduced literacy developing in the United States, it is important to reduce such operations to a lower level of intellect so as to allow the processes to continue unaffected by lower skilled personnel.

In other situations, such as in the home or office, it is not feasible to use pressure gauges and require the house person or office worker to calculate the differential. In these cases, as with recent industry trends, it is desirable to use the pressure differential to provide a visual indication that the media has become or soon will become clogged to the point where efficiency decreases to the intolerable levels previously described.

The following patents were uncovered in a prior art search: U.S. Pat. Nos. 2,669,707; 2,888,898; 3,024,655; 3,182,630; 3,199,488; 3,358,835; 3,358,836; 3,481,304; 4,060,050; 4,254,731; and, 4,375,789. All of these patents disclose some type of visual indicator that signals a value of pressure differential that is related to the degree of clogging of a filter, membrane or other separation media. All of these patents have two discernible shortcomings; first they are only designed for a specific piece of equipment and thus not amenable to a wide range of other products; and, second, they use a source of light, to illuminate the signal device, that must be sourced from a different location than the signal itself. This latter shortcoming means that, to be effective, the signalling device must be located in a lighted area so that the source of light inputted to the device provides sufficient light energy to allow the signal to be seen from a different direction.

Further, the devices of the prior art are constructed to be used either always inside a filter-containing enclosure, such as a filter tank, or used always outside the process equipment, such as in the lines that transport fluid from unit to unit. There appear to be no devices that may find employment both inside as well as outside process equipment. Still further, the devices of the prior art are overladen with pressure holding flanges, etc. that make their use cumbersome and difficult.

It clearly appears that the prior art is still in need of a separation medium efficiency indicator that is small, of simplified manufacture and operation, that may be employed both inside and outside process equipment, and that gathers light, for illumination of the signal element, through the same aperture in which the signal is visually observable so that the whole device may be mounted in areas of darkness presently unavailable with existing devices.

A further shortcoming in the prior art is that all these devices divert the filtered water through the visual indicator; probably on the theory that such clear water will aid in keeping the visual field clear to view. Unfortunately, the filter media often removes bactericides, such as chlorine, from the water. In its absence, bacteria not trapped by the media pass into the finished water stream and multiply rapidly. The result is that mildew rapidly develops about the indicator and clouds the view area such that visual perception of the indicator is lost.

SUMMARY OF THE INVENTION

This invention is a separation medium efficiency indicator, otherwise known in some circles as a water filter life indicator, that overcomes the drawbacks and shortcomings of the prior art previously mentioned herein. It is a small device, including a moveable piston interposed the first volume or inlet water stream and the second volume or outlet water stream. In one embodiment the piston is held in a non-signalling position by a spring whose force is set to be overcome when the pressure differential across the medium or filter rises to a value wherein the efficiency of the filter has been compromised by impurities to an intolerable level so that the operator, he or she being a factory worker or house person, will be given a clear indication to either shut down the separation process and replace the clogged filter with a fresh filter, or bypass the process stream through another circuit containing a fresh filter. With the use of the fresh filter, the pressure differential is once more reduced to a low value and the piston is biased back into a position wherein there is no visual signal to be observed.

In another embodiment of the invention the piston is held in a visual indicating position at all times, displaying a green color, while the filter media is working efficiently, and changing to display a red color when the media has become clogged to the point of inefficient operation. In both these embodiments, and especially in the second embodiment, incoming, non-filtered water continually washes over the indicator so that the chlorine or other bactericide therein will operate to prevent the growth of vision-blocking mildew or other bacteria.

The invention utilizes a unique construction of simple elements to achieve this indicator function in a very small volume. Accordingly, it finds use in process equipment, where it is mountable inside the unit and observed through a small aperture formed in the wall of the unit, or contained in a small enclosure for independent use within a complex of processing equipment. Further, the light used to illuminate the visual indicator is gathered in the view lens itself, not remotely as in other prior art devices, and thereafter transported to the piston location where, upon movement of the piston into the position indicating a needed replacement of the filter, the inputted light rays are focused on the exterior surface of the piston. The piston is coated with a bright reflecting paint that reflects the light rays out through the same element that transported the light into the device. In one embodiment, when the filter media is being used efficiently, the piston is not in the indicative position and the transmitted light is designed to fall into an empty space where it is fully attenuated producing a black (non-image) indication through the lens. In another embodiment the piston is held in a first position to reflect a green color instead of a non-color (black). A special means is provided to collimate the incoming light rays and focus them on the piston when it is in the indicative position. The bright, colored coating on the piston surface produces a very high percentage reflection of light so that this device may be mounted in dark places presently not usable with prior art devices.

The signal viewing lens is uniquely designed to not only gather incoming light and send it along an optical rod to the piston, but is usable, without overlying pressure gaskets, so that it is amenable to systems utilizing low to medium pressure to high pressure up in the 135 psig range. This design produces a smooth exterior on plant equipment as well as when mounted on other devices so that it may be handled without the potential for collision with other objects and concomitant failure that plagues the prior art.

Accordingly, the main object of this invention is a separation medium efficiency indicator that gathers light through the same lens which shows the visual indication that the medium needs replacement. Other objects of the invention include a filter life indicator containing a brightly coated moveable piston that reflects a high percentage of the light inputted through the viewing lens; a device whose indications of medium replacement may be adjusted by altering the constant of the piston biasing spring; a device whose gathered light rays are collimated and focused onto the piston when it is in the indicative position, to produce a bright visual response, and, in one embodiment, whose rays are focused in an attenuating void when said piston is not in its indicative position to produce a black visual response at the viewing lens; a device usable with a liquid or a gaseous fluid; a device useable in filtration processes and reverse osmosis processes; a device mounted in a chassis that may be mounted internally or externally process equipment; a device wherein the viewing lens may be displaced from the location of the piston; a device where the viewing lens supports activities in pressures in the range of 150 psig and below; and a device for providing a clear signal that the medium has clogged to the point where efficient separation has been lost and a device that saturates the visual indicator with unfiltered water to allow the bactericide therein to prevent growth of vision-impeding bacteria.

These and other objects of the invention may be determined by reading the following description of the preferred embodiments taken together with the drawings appended hereto. The protection sought by the inventor may be gleaned from a fair reading of the claims that conclude this specification.

DESCRIPTION OF THE DRAWINGS

FIG. 10 is a side view of the piston rod carried in the tube;

FIG. 11 is an end view of the piston rod shown in FIG. 10;

DESCRIPTION OF THE PREFERRED EMBODIMENT

The following description is based upon the installation of this invention in a water filter for use in the home or office.

However, this is not to be taken as limiting the use of the invention as it finds wide application in all areas where filtration and/or reverse osmosis processes are utilized. All of these other uses are fully contemplated within the scope and spirit of this invention.

Turning now to the drawings, where like elements are identified with like numerals throughout the thirteen figures, a first embodiment of the invention is shown in FIGS. 1 through 4 to comprise a chassis 1, formed of strong, rigid material such as aluminum or fiber-filled epoxy resins sufficient to hold all the necessary components in functional relationship under surges of water pressure in excess of 135 psig. Chassis 1 is preferably in the form of a rectangular frame formed by a pair of narrow arms 3a and 3b forming respectively the top and bottom parts of the frame, held in spaced-apart arrangement by a pair of similar narrow arms 5a and 5b forming respectively the sides of the frame. The inside surfaces 7 of bottom arm 3b and the inside surface 9 of side arm 5b are preferably flattened and then polished to a glossy finish to provide offset light reflecting surfaces.

Figure 1:
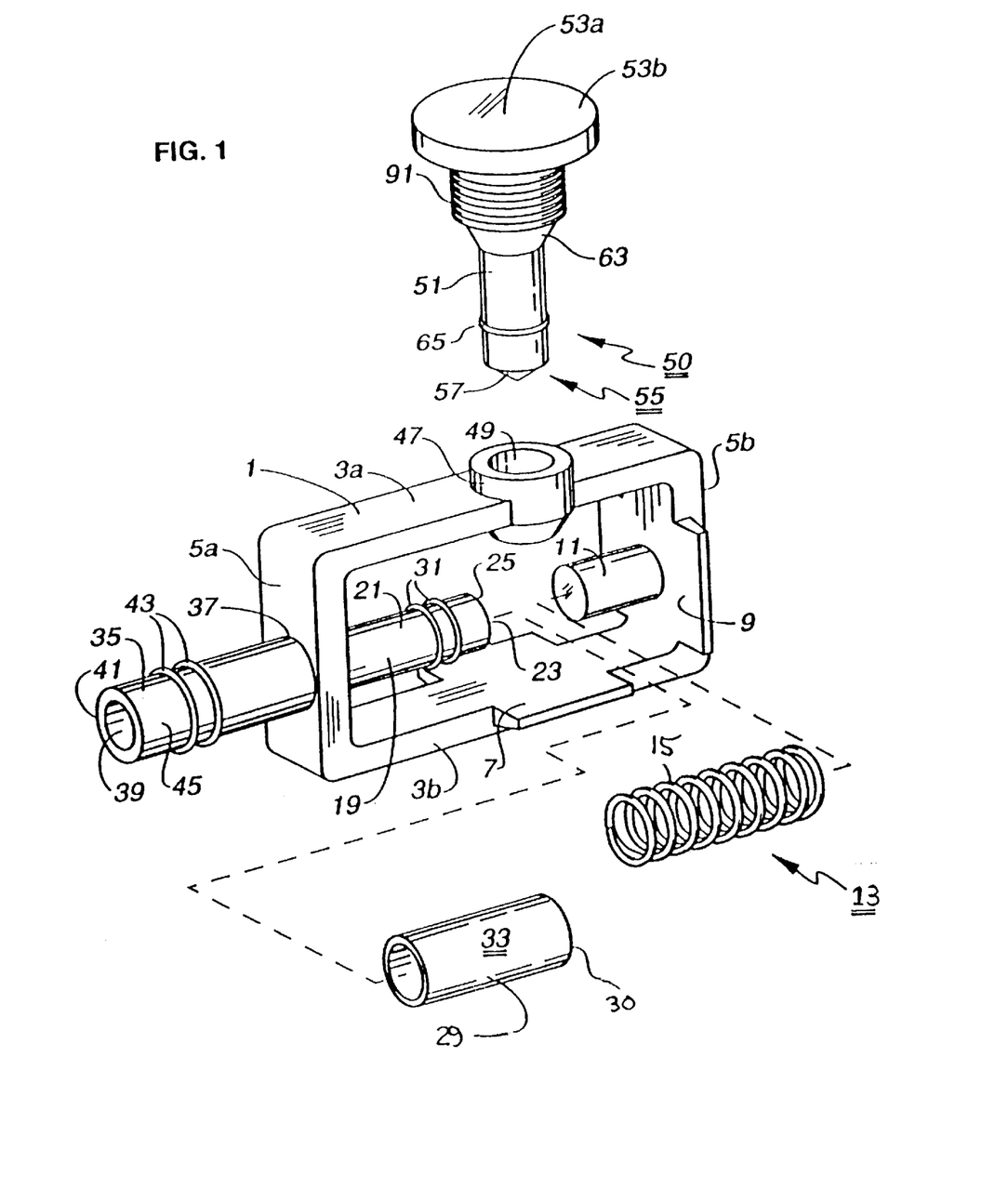
FIG. 1 is an exploded view of the basic components of the first embodiment of this invention.

A short stub or pedestal 11 extends inward from said frame a short distance from side arm 5b and is preferably cylindrical in form and is made integral with chassis 1. First biasing means 13, in the form of a coiled calibrated spring 15 of a length greater than stub 11 is slipped over stub 11.

A hollow, cylindrical element 19 is mounted opposite stub 11 on side arm 5a and oriented to be axially aligned with and pointing toward stub 11 so that the center lines of stub 11 and element 19 coincide. Element 19 is defined by an outer cylindrical surface 21 and an inner bore 23 that extends from the exposed open end 25 of element 19 through to an aperture 27 formed in side arm 5a (see FIG. 4). A closed-end piston 29 is positioned over element 19 for reciprocal movement thereover between a first position, wherein piston 29 is fully mounted on element 19 and piston closed end 30 abuts element end 25, and a second position wherein piston 29 slides forward, toward pedestal 11. The second position of piston 29 is achieved when it has collapsed or compressed spring 15 and moves into abutting contact with pedestal 11. At least one, but preferably a pair, of wiper rings 31 are placed or formed about cylindrical element 19 in spaced-apart arrangement to bear against the inside wall of piston 29 to reduce leakage of fluid that drives piston 29 along element 19. Piston 29 is made of rigid material and is coated, on it outside surface 33, with a brightly colored reflective coating such as Neon Red.

An elongated hollow fitting 35 is attached at its one distal end 37 to side arm 5a and axially aligned with cylindrical element 19. The hollow interior 39 of fitting 35 is mated to aperture 27 formed in side arm 5a (FIG. 4) so that a clear path extends from the opposite distal end 41 of fitting 35 interior thereof, through the aperture in side arm 5a, through inner bore 23 to open end 25 of hollow cylindrical element 19. At least one, but preferably a pair of external rings 43 are placed about the outer surface 45 of fitting 35 for snugly receiving thereover a length of rubber hose.

A boss 47 is formed on chassis top arm 3a and has formed therethrough a bore 49, preferably located in the area above the space between the respective, spaced-apart interior ends of pedestal 11 and cylindrical element 19. A second means 50 is provided in the form of a light transmitting rod 51 of terminal length defined at its outer end by a viewing lens 53a and a light gathering area 53b integral therewith, and at its inner end by separate third means 55 including a light focusing element such as a cone-shaped portion 57. Element 57 focuses the light, gathered in end area 53b, and transmitted interior chassis 1 through rod 51, into the space between respective spaced-apart element end 25 and the exterior end of pedestal 11.

Light transmitting rod 51 is made of clear plastic, such as polyacrylamide or polycarbonate, with a smooth, light-containing surface. A tapered portion 63 may also be provided to concentrate the rays of light, received in through outer end 53a/53b, into rod 51 for transmission to focusing element 57. At least one protruding seal ring 65 is formed about rod 51 for receipt in a like-size channel formed in bore 49 to hold the rod in fixed position in chassis 1.

Figure 4:
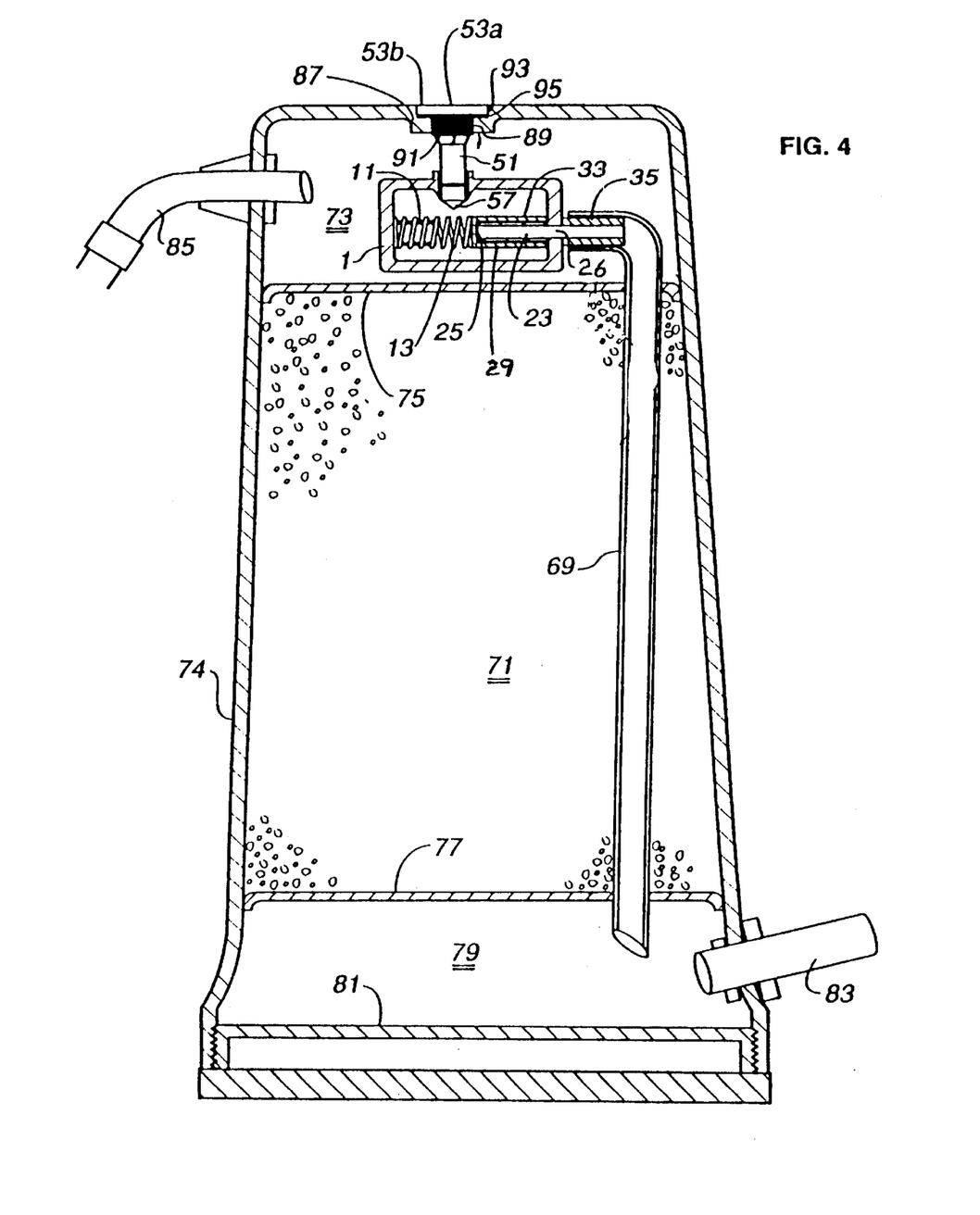
FIG. 4 is a side elevational sectional view of one embodiment mounted inside a separation processing unit.

In operation, spring 15 is positioned on pedestal 11 and biases piston 29 down against open end 25 of hollow element 19. As shown in FIG. 4, hollow elongated fitting 35 is connected by a tube or pipe 69 to the input or high pressure side of a filter 71. Chassis 1 is mounted in the output plenum 73 or low pressure side of said filter so that piston 29 is held against element open end 25 by a combination of pressure from coil spring 15 and the pressure on the output side of filter 71.

The constant of coiled spring 15 is set by known spring manufacture techniques to begin to be overcome and collapse when the pressure from the input side of filter 71 (see FIG. 4), transmitted via tube 69, hollow fitting 35, aperture 27 and inner bore 23 to the back side of piston 29, begins to exceed the combined pressure from spring 13 and the output pressure of the fluid on the face of piston 29. When this occurs, piston 29 moves toward pedestal 11 and under the cone-shaped end 57 of rod 51. Further movement is prevented by pedestal 11. Prior to this movement, the light rays received in rod end 53a/53b pass through cone-shaped element 57 and strike coil spring 15 and are scattered throughout the void between piston 29 and pedestal 11. The rays attenuate and do not reflect back into optical rod 51 so that the image, seen when looking into lens 53a, is black or substantially devoid of visible light.

When piston 29 is driven by the pressure differential of the fluids to its second position, under light rod element 57, the rays of light, gathered in through light gathering area 53b are concentrated and transmitted along rod 51 and are focused by cone-shaped rod end 57 onto the brightly colored coating on piston outside surface 33. This bright, reflective coating, along with the reflecting surfaces on frame inside surfaces 7 and 9, cause a substantial amount of the incoming light rays to be transmitted back up through optical rod 51 and out viewing lens 53a, in the wave length of the bright color, such as Neon Red, covering piston 29. This complete change in color from near black to bright red provides a clear indication that the pressure differential across the separation media has now reached a value indicating pluggage of the media and loss in separation efficiency. In addition, by combining the light gathering area 53b with the viewing lens 53a the invention may be employed in areas that are normally dark or devoid of light. Upon viewing, one has only to provide light at the viewing lens because this light will enter rod 51 through area 53b, travel down rod 51 and pass through focusing element 57 to be focused into the void between element end 25 and pedestal 11. Should piston 29 be located in its second or indicative position, then the light will reflect off the bright coating and return, through element 57 and rod 51 and exit through lens 53a. The reflected light will be of a different wave length than the entering light so that little or no attenuation or cancellation will take place. Should the invention be mounted, for example, under a counter-top and/or within a cabinet, the mere act of opening the cabinet door will provide sufficient light to light-gathering area 53b to allow viewing of the piston color through lens 53a. No other light source is needed.

As shown in FIG. 4, this invention may be installed directly in process equipment, such as the filter defined by a housing 74 and held in place by upper and lower porous containment plates 75 and 77 respectively between an input plenum 79 and output plenum 73. The unit is sealed with a base threaded housing plug 81, is fed by an input line 83 and empties its purified fluid through an output line 85. An inwardly-facing boss 87, having a threaded bore 89 formed therethrough is provided in housing 74 for threaded receipt with the threaded portion 91 formed on light rod 51. A counter-sunk area 93 is formed in the outer area of aperture 89 to receive rod end 53a/53b therein as well as to receive an O-ring 95 to help seal the unit against pressure leakage. While in FIG. 2, lens 53a is shown mounted directly above chassis aperture 49; it need not be the case in all situations. The unique design of this invention, allowing the visual indicating light to pass both in and out through the same lens, allows light transmitting rod 51 to bend the light rays, both inwardly and outwardly bound, so that rod end 53a/53b may be located in some other area and light rod 51 bent to pass around interior parts of the equipment.

Figure 2:
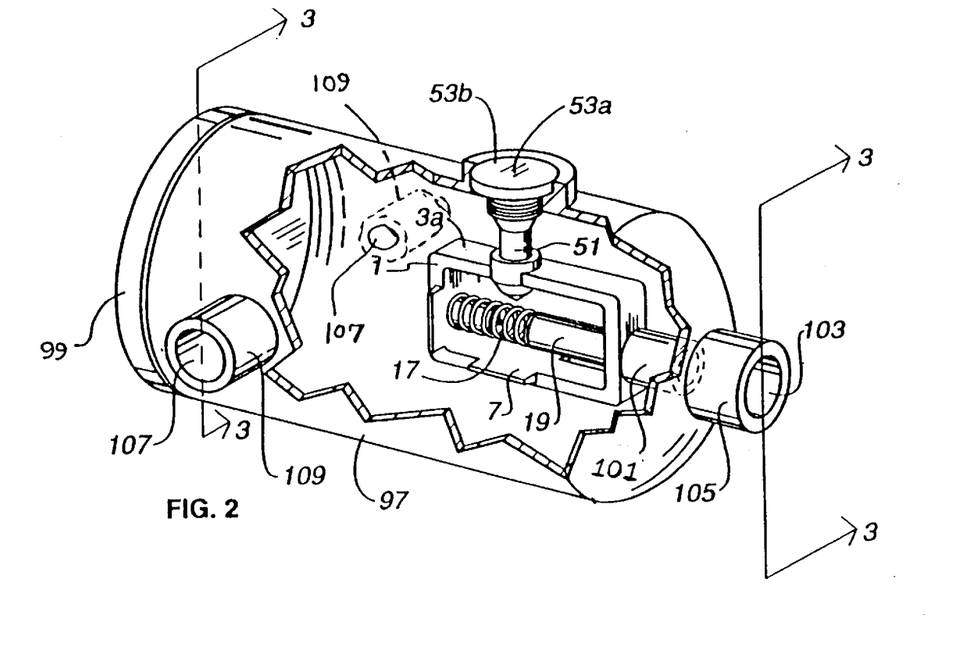
FIG. 2 is a trimetric view with a portion partially cut away, showing the embodiment of the invention shown in FIG. 1 used independently outside the separation processing equipment.
Figure 3:
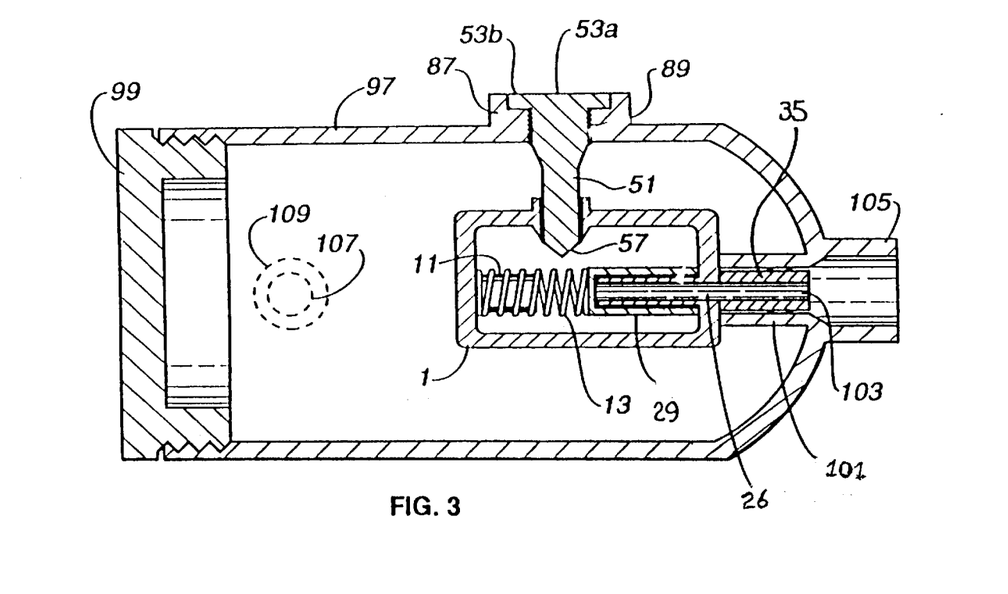
FIG. 3 is a side elevational sectional view of the same embodiment, taken along lines 3—3 in FIG. 2.

This novel device may also be self-contained for connection to fluid transfer lines passing between process equipment. As shown in FIGS. 2 and 3, chassis 1 and its previously described components may be contained in a sealed housing or enclosure 97 that is closed at one end with a threaded plug 99. Hollow, elongated fitting 35 is fixedly received in an inwardly directed boss 101 having a central opening 103 passing therethrough and out of said housing through an external fitting 105 that is internally threaded and connectable to the intake of the separation unit. At least one, but preferably two ports 107 are formed in housing 97 and fitted with short threaded stubs 109 for interconnection with the output or low pressure side of the separation unit so that the first and second pressures are passed interior housing 97. A boss 87 and threaded aperture 89, similar to that described with respect to FIG. 4, positions light rod 51, rod end 53a/53b and cone-shaped rod end 57 in proper functional relationship.

A second embodiment of this invention is shown in FIGS. 6 through 9. In this embodiment there is a positive visual indication of the status of the filter media at all times, a green color indicating the media is functioning efficiently and a red color indicating the filter has clogged. In addition, the visual indicator is saturated with unfiltered water so that this water is, in most cases, chlorinated and aids in maintaining a low bacteria count so that the colors are more easily observed.

Figure 7:
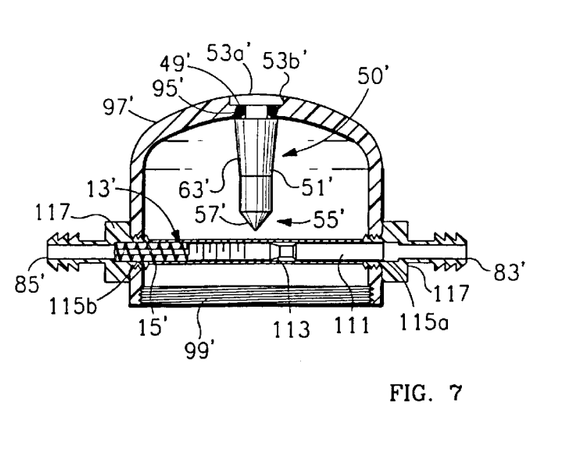
FIG. 7 is a side view, partly in section, of the same embodiment taken along lines 7—7 in FIG. 6.
Figure 8:
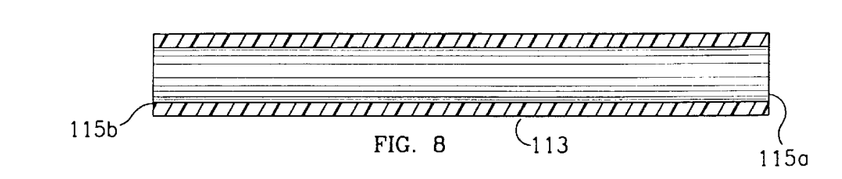
FIG. 8 is a sectional side view of the tube that carries the piston rod for reciprocal movement therein taken along lines 8—8 in FIG. 9.
Figure 9:
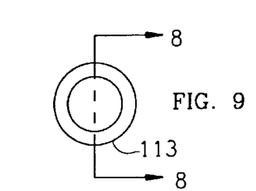
FIG. 9 is an end view of the tube shown in FIG. 8.
Figures 10, 11, 13:
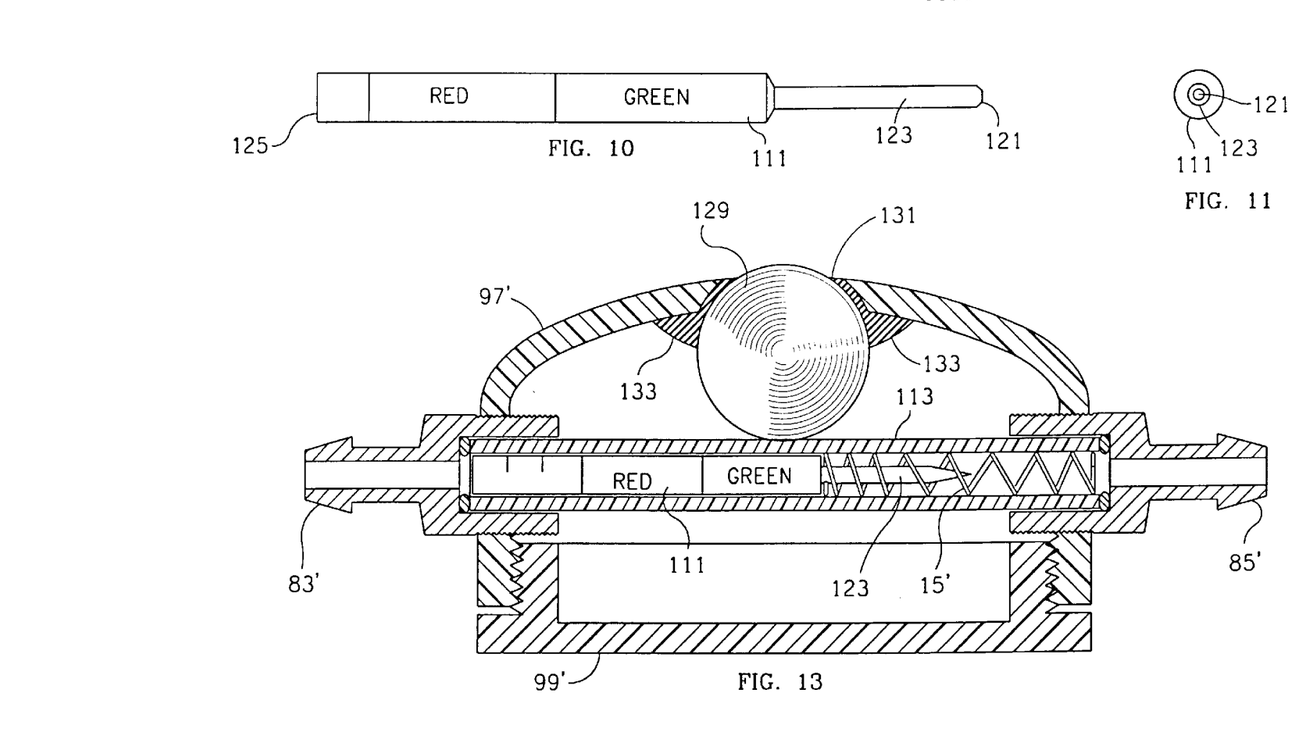

As shown in FIGS. 7, 10 and 11, a piston rod 111 is slidingly received in a clear hollow tube 113 for reciprocal movement between first and second spaced-apart positions. Tube 113 is hydraulically connectable between the inlet water volume through inlet line connector 83' and the outlet water volume through outlet line connector 85'. When used with outside process equipment, this embodiment is placed in parallel with the filter medial by a separate hydraulic line. This way it may conveniently be placed near a light source and need not be trapped into a position where the filter is located. Rod 111 and tube 113 are contained in a housing 97' that is closed by a threaded plug 99'.

As shown in FIG. 10, piston rod 111 is graduated in diameter along its length and contains a red colored area and a green colored area. First bias means 13', shown in the form of a calibrated spring 15', biases said rod into a first position when the pressure differential across tube 113 is equal to or less than a value representing efficient separating activity of the filter medium.

A bore 49' is formed in housing 97' located in the area above the space between the respective spaced-apart ends 115a and 115b of clear tube 113. Second means 50' is provided in the form of light transmitting rod 51' and defined by outer viewing lens 53a' and light gathering area 53b' and third means 55' including cone-shaped area 57'. A tapered portion 63' is included as well as an "O"-ring 95'.

The operation of this embodiment is the same as with the first embodiment. As the pressure falls at the inlet of clear tube 113, the bias pressure of spring 13' moves rod 111 from its "green" position under lens 53a'0 to its "red"position thereby indicating a loss of efficiency in the filter media.

As shown in FIGS. 10 and 11, rod 111 is preferably terminated at one end 121 with a narrow diameter extension 123 that acts as a guide for that portion of the rod involved with spring 15'. The other end 125 of rod 111 is of a larger diameter to abut "O"-ring 117 located at tube end 115b.

Figure 12:
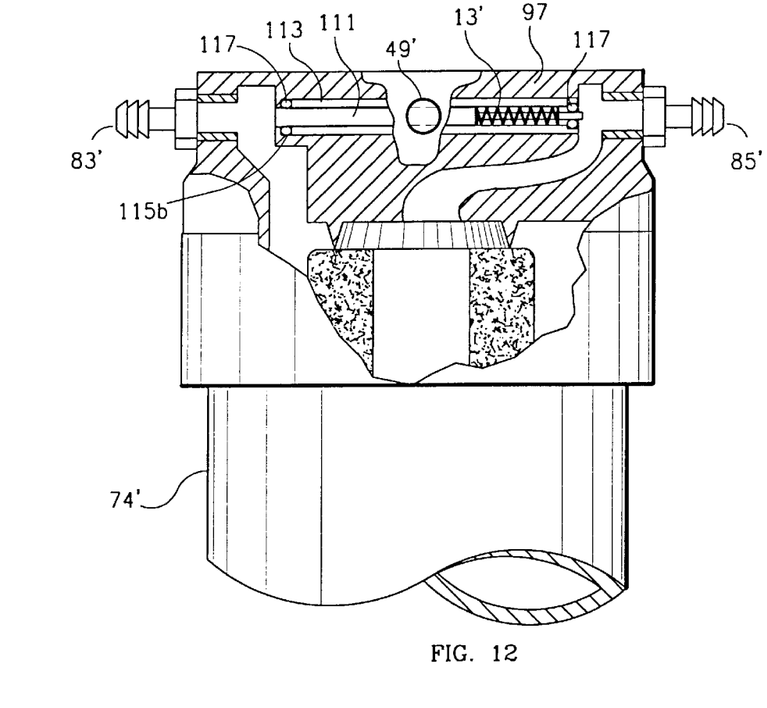
FIG. 12 is a side view, partly in section, of this second embodiment being used inside filter equipment; and, FIG. 13 is a side elevational view of another embodiment of this invention wherein an optical sphere is used to improve the light-gathering aspect of the invention.

This second embodiment is also useful for mounting inside processing equipment. As shown in FIG. 12, this embodiment is contained in a housing 74' where clear tube 113 spans between an inlet 83' and an outlet 85'. A bore 49' is formed in housing 74' and includes means 50', rod 51' and the other structure heretofore discussed earlier (not shown).

A third embodiment is shown in FIG. 13 wherein an optical sphere 129 of one diameter is mounted under an aperture 131 of a lesser diameter formed in housing 97' and held therein by spots of glue 133 or the like. The difference in diameters of sphere 129 and aperture 131 provides pressure containment inside housing 97'. The unique aspect of this embodiment is that sphere 129 gathers in a significant amount of exterior light and focusses it on rod 111 while simultaneously providing a great magnification of the colors on rod 111. This provides for more noticeable color change while at the same time lowering the cost of manufacture by eliminating the cost of forming second means 50 with its rod 51, view lens 53a, light gathering area 53b, third means 55 and focusing element 57.

Figure 5:
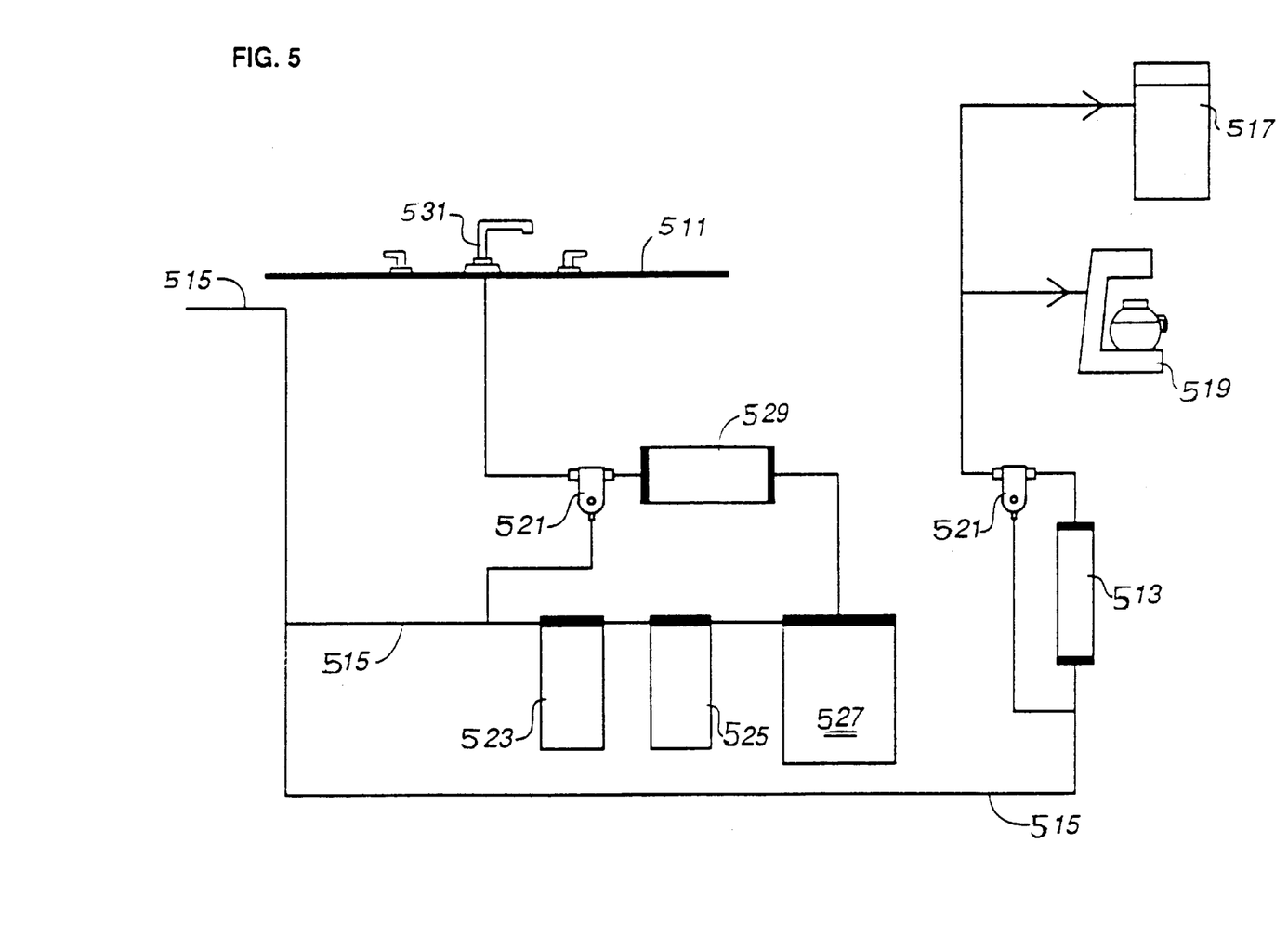
FIG. 5 is a schematic view of a variety of uses of the independent water filter life indicator in the kitchen of a modern home.
Figure 6:
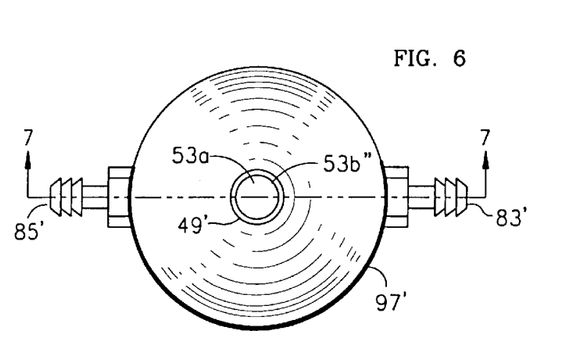
FIG. 6 is a top view of a second embodiment of the invention adapted for use in external processing equipment.

Shown in FIG. 5 is a schematic of separation and filtration equipment found in growing abundance in the modern household, particularly in the kitchen. Shown under a kitchen counter 511 is a filter unit 513 for connection between the house water inlet line 515 for providing purified water for an ice maker 517 and a coffee maker 519. This invention, labelled 521, in its self-contained form as shown and described in FIGS. 2 and 3, is interconnected by ordinary pressure-tight fittings and water lines (not specifically labelled) to the inlet and outlet lines of filter unit 513, as previously described in relation to the form shown in FIGS. 2 and 3. Even though the invention 521 is mounted in a darkened area under the counter, and most always closed therein by a door (not shown), once the door is opened, the light entering that area is gathered in part by light gathering area 53b and will provide the necessary light energy to show a bright red indication in lens 53a or a green or red indication when filter unit 513 is plugged to the point of inefficient operation.

A reverse osmosis process is also shown under counter 511 to comprise a first coarse screen unit 523, the standard reverse osmosis semi-permeable membrane unit 525, a clear water holding tank 527 and a polishing filter 529 wherein the output line leads to a water faucet 531 mounted on top of the counter. Here, the invention 521, in its self-contained form is shown to be interconnected incoming water line 515 and the output of polishing filter 529. Upon observing a red signal at lens 53a, the home owner will be put on notice that either screen 523, membrane unit 525, or polishing filter 529 or a combination of them have become fouled and need tending.

While the invention has been described with reference to a particular embodiment thereof, those skilled in the art will be able to make various modifications to the described embodiment of the invention without departing from the true spirit and scope thereof. It is intended that all combinations of elements and steps which perform substantially the same function in substantially the way to achieve substantially the same result are within the scope of this invention.

What is claimed is:

1. In a separation system wherein a first volume of fluid is exposed, under a first pressure, to a separation medium and a second volume of fluid is recovered therefrom, under a second, lesser pressure, a medium separation efficiency indicator comprising:

a housing including an aperture;

a tube mounted to said housing;

means for connecting said tube to the first pressure;

means for connecting said tube to the second pressure such that the differential of said pressures is transmitted interior thereof;

a piston rod for reciprocal movement in said tube driven between a first position and a second spaced-apart position by the differential between said first and second pressures when said second pressure represents an undesired loss of medium separating efficiency; said piston rod having a first colored coating at one location on said rod and a second colored coating at a second location thereon;

biasing means for biasing said piston rod in the first position when said pressure differential is equal to or less than a value representing efficient separating activity of said medium; and, a sphere of optical transparent material mounted so as to project through said aperture of said housing; said sphere including:

an outer portion exterior said aperture for gathering light exterior the aperture; and an inner end interior said aperture and disposed adjacent said tube; said sphere for concentrating the gathered light in an area, the area being that occupied by said first colored coating when said piston rod is in its first position and that occupied by said second colored coating when said piston rod is in its second position, and for receiving light reflected from a said coating and projecting it out through said outer portion thereby providing a clear visual indication of efficiency of said medium.

2. The indicator of claim 1 wherein:

msaid coatings are highly reflective.

* * * * *